US012263445B2

(12) United States Patent
Walker

(10) Patent No.: US 12,263,445 B2
(45) Date of Patent: Apr. 1, 2025

(54) FILTER MEMBRANE WITH BI-DIRECTIONAL FLOW ENHANCING FEATURES

(71) Applicant: U.S. GOVERNMENT AS REPRESENTED BY THE SECRETARY OF THE UNITED STATES ARMY, Washington, DC (US)

(72) Inventor: Jeremy S. Walker, Oakland, MI (US)

(73) Assignee: US Government as represented by the Secretary of the Army, Washington, DC (US)

(*) Notice: Subject to any disclaimer, the term of this patent is extended or adjusted under 35 U.S.C. 154(b) by 1213 days.

(21) Appl. No.: 16/101,747

(22) Filed: Aug. 13, 2018

(65) Prior Publication Data

US 2019/0151799 A1     May 23, 2019

Related U.S. Application Data

(60) Provisional application No. 62/545,099, filed on Aug. 14, 2017.

(51) Int. Cl.
    *B01D 61/08*     (2006.01)
    *B01D 63/10*     (2006.01)
    (Continued)

(52) U.S. Cl.
    CPC ............ *B01D 61/08* (2013.01); *B01D 63/10* (2013.01); *B01D 65/02* (2013.01); *B01D 65/08* (2013.01);
    (Continued)

(58) Field of Classification Search
    CPC ........ B01D 61/08; B01D 63/10; B01D 65/02; B01D 65/08; B01D 69/06; B01D 2321/02;
    (Continued)

(56) References Cited

U.S. PATENT DOCUMENTS 6,632,357 B1    10/2003    Barger et al.
7,311,831 B2    12/2007    Bradford et al.
(Continued)

FOREIGN PATENT DOCUMENTS

WO     2016048923 A1     3/2016
WO     2016167831 A1     10/2016

OTHER PUBLICATIONS

Ngene, I., et al., "Particle deposition and biofilm formation on microstructured membranes", Journal of Membrane Science, 364, pp. 43-51. (Year: 2010).*

(Continued)

*Primary Examiner* — Benjamin L Lebron

(57) ABSTRACT

A novel filter media includes an array of raised features formed directly on the membrane surface, which create a feed channel. The predetermined configuration of features is dually optimized both for filtration in a first flow direction to maximize unobstructed fluid flow and prevent fouling. The same feature configuration is also optimized for enhancing/increasing turbulence and scouring of the membrane when the flow through the filter is reversed during a cleaning operation. The feature configuration can also be optimized to capture bubbles in reverse flow such that the captured bubbles can be oscillated to further scour the membrane and the features themselves (e.g., in their cavities, etc.).

18 Claims, 14 Drawing Sheets

(51) Int. Cl.
    *B01D 65/02*     (2006.01)
    *B01D 65/08*     (2006.01)
    *B01D 69/06*     (2006.01)
    *C02F 1/44*     (2023.01)
    *C02F 103/08*     (2006.01)

(52) U.S. Cl.
    CPC .............. *B01D 69/06* (2013.01); *C02F 1/441* (2013.01); *B01D 2321/02* (2013.01); *B01D 2321/04* (2013.01); *B01D 2321/18* (2013.01); *B01D 2321/2058* (2013.01); *B01D 2321/2083* (2013.01); *B01D 2325/06* (2013.01); *B01D 2325/08* (2013.01); *C02F 2103/08* (2013.01); *C02F 2303/16* (2013.01)

(58) Field of Classification Search
    CPC ............ B01D 2321/04; B01D 2321/18; B01D 2321/2058; B01D 2321/2083; B01D 2325/06; B01D 2325/08; C02F 1/441; C02F 2103/08; C02F 2303/16
    See application file for complete search history.

(56) References Cited

U.S. PATENT DOCUMENTS

| | | | |
|---|---|---|---|
| 8,883,007 | B2 | 11/2014 | Buser et al. |
| 9,649,598 | B2 | 5/2017 | Gilron et al. |
| 2004/0011723 | A1 | 1/2004 | Bradford et al. |
| 2006/0169138 | A1 | 8/2006 | Schmidt |
| 2006/0219635 | A1 | 10/2006 | McCague et al. |
| 2012/0018366 | A1* | 1/2012 | Buser .................... B01D 65/08 210/321.64 |
| 2012/0298578 | A1 | 11/2012 | Herrington et al. |
| 2013/0098831 | A1 | 4/2013 | Shrikhande et al. |
| 2013/0213880 | A1 | 8/2013 | Hirozawa et al. |
| 2018/0021733 | A2 | 1/2018 | Gilron et al. |

OTHER PUBLICATIONS

Walker, J., "Analysis of micromixers to minimize scaling effects on reverse osmosis membranes", Wayne State University Dissertations. Jan. 2018.*

S.T.V. Sim et al., Development of novel acoustic sensor for early detection of biofouling in reverse osmosis systems, Procedia Engineering, 2012, 562-566, 44, Elsevier Ltd., Amsterdam Netherlands, available at www.sciencedirect.com.

Altman, Susan J. et al., Systematic analysis of micromixers to minimize biofouling on reverse osmosis membranes, Water Research, 2010, 3545-3554, 44, Elsevier Ltd., Amsterdam Netherlands, available at www.sciencedirect.com.

Schwinge, J. et al., Spiral wound modules and spacers: Review and analysis, Journal of Membrane Science, 2004, 129-153, 242, Elsevier B.V., Amsterdam Netherlands.

Bucs, Sz S., et al.; "Effect of different commercial feed spacers on biofouling of reverse osmosis membrane systems: a numerical study"; Desalination, vol. 343, pp. 26-37; Jun. 16, 2014.

"FILMTEC Reverse Osmosis Membranes Technical Manual"; DOW Water & Process Solutions; The DOW Chemical Company; Form No. 609-00071-0416; 181 pages; publication date unknown.

"Membrane Filtration Guidance Manual"; U.S. Environmental Protection Agency; Office of Water; EPA 815-R-06-009; 332 pages; Nov. 2005.

* cited by examiner

FILTER MEMBRANE WITH BI-DIRECTIONAL FLOW ENHANCING FEATURES

CROSS-REFERENCE TO RELATED APPLICATIONS

This application claims the benefit of U.S. Provisional Patent Application Ser. No. 62/545,099, filed on Aug. 14, 2017 by the same inventor, which is incorporated by reference herein in its entirety.

GOVERNMENT INTEREST

The inventions described herein may be made, used, or licensed by or for the U.S. Government for U.S. Government purposes. This patent is available for licensing to qualified licensees.

BACKGROUND OF THE INVENTION

Field of the Invention

The present invention relates to filters of the type commonly used to improve the quality of drinking water (e.g., reverse osmosis, etc.), and more specifically to a filter leaf for use in such a filter.

Description of the Background Art

With oceans containing 97% of the accessible water in the world, desalination of sea water is likely to become increasingly important in meeting potable water demands created by industry, population growth, and the ever changing environment. Reverse osmosis (RO) is a widely used technology for desalination due to its relatively low energy usage and continuous operations. Current RO systems are typically able to generate potable product water from which 99 percent of the sodium chloride and other sea salts have been removed ("rejected"). Ordinary seawater contains about 3.5 percent (35,000 ppm) sea salts, so the product water should contain about 350 ppm dissolved salts.

Osmosis is the process where water passes through a "semi-permeable" membrane. The water transport is facilitated by the concentration gradient due to a dilute solution on one side of the membrane and a concentrated solution on the other side, water flows to the higher concentration side. In RO, pressure is applied to the concentrated solution side of the membrane, thus reversing this process. RO may be further defined as a membrane separation process, which is primarily used to purify water with dissolved contaminants, specifically salt as is the case with sea water.

A common configuration for RO filter elements is the spiral wound design in which one or more "leafs" comprising two membrane sheets separated by a thin feed channel are wrapped around a central tube. The spiral-wound configuration offers the advantage of a high ratio of active membrane area to volume. For example, 400 sq. ft. of membrane area can be packaged in a cylinder of 8 in. diameter by 40 in. long. To achieve such space-efficient designs, the membrane layers and the feed channels separating them should be made as thin as possible. A mesh spacer is commonly used to separate the membrane layers and, thus, form the feed channel. However, these mesh spacers necessarily constitute a partial blockage to the flow of feed water and have been found to create areas of low flow velocity in the feed channel.

It has been found that low flow velocity points/areas in the feed channel, particularly where the mesh layer contacts the membrane surface and at intersections in the mesh itself, allow bio-fouling and colloidal fouling to occur, which can reduce membrane performance. Additionally, relatively rapid fouling can occur if the water being fed to the filter contains suspended solids and other fouling compounds. Under such conditions, pretreatment of the water is sometimes used to remove contaminants to maintain an acceptable level of membrane performance. Due to size and weight constraints, pretreatment is often impractical or inadequate, particularly in mobile systems of the type used in the field by the U.S. Army, which contributes to the premature fouling of RO elements.

It is known to use chemical treatments to clean RO filter elements when they start to foul and to replace them when irreversibly fouled. Attempts have therefore been made to fabricate RO membranes out of materials that are resistant to oxidant cleaning solutions (such as chlorine) yet still retain sufficiently high rejection and flux characteristics. This would allow membranes to be cleaned with chemicals like chlorine to remove or prevent biofouling without degrading the membrane. Unfortunately, these attempts have met with limited success, in terms of both performance and economics.

As an alternative to using a separate mesh layer to form the feed channel, it is known to provide raised (i.e., 3-dimensional) features that are formed integrally with or directly on the surfaces of the membrane sheets such that the raised features act as spacers between adjacent layers. The raised features may be produced, for example, by an embossing process (with or without heat, depending upon the material involved) or a 3-D printing process. The use of 3-D printers to form 3-dimensional features directly on the RO membrane surface has been tried, but not adopted until recently due to membrane damage during printing (e.g., high heat, curing, etc.) and the associated resistance of industry to incorporate the technology for mass production. As a result, RO filter elements typically employ the mesh-type feed spacers.

SUMMARY OF THE INVENTION

The present invention relates to removing dissolved solids from water by the process known as Reverse Osmosis (RO) to render the treated water potable and safe for human consumption from the standpoint of total dissolved solids (TDS).

In a disclosed embodiment, a RO filter has raised features formed directly on the membrane surface, which create a feed channel. Advantageously, the predetermined configuration of features is dually optimized both for water filtration in the normal flow direction to maximize unobstructed fluid flow, and the same feature configuration is also optimized for enhancing/increasing turbulence and scouring of the membrane when the flow through the filter is reversed during a cleaning operation. The predetermined configuration can also be optimized to capture bubbles in reverse flow and to oscillate such captured bubbles without harmful cavitation using acoustic streaming to further scour the membrane and the features themselves (e.g., in their cavities, etc.). The bubbles can then be flushed out in forward flow (also without cavitation). The disclosed feature configuration thus enhances and improves cleaning of the membrane of build-up, fouling, and/or contaminants. This serves to eliminate the need for cleaning chemicals by allowing the use of a reverse flow of water (or other non-caustic cleaning solution) to keep the membrane surfaces clean and operating efficiently.

The disclosed new configuration of raised features separating the membrane leaves of a spiral-wound RO element creates a flow pattern in the feed channel that will decrease the fouling potential of the membrane (without impacting the high flux and rejection currently achieved) and also improve the efficiency of a back-flush cleaning operation. The new design for separating the membranes and creating a feed channel consists of raised features (also referred to as microstructures, due to their small dimensions) that are preferably printed directly on the membrane surface. The invention microstructures are configured to enhance flow in both the "normal" filtrations direction of flow and in the "reverse" cleaning/flushing direction of flow through the filter.

The raised features are formed (e.g., 3-D printing process may be used to advantage) in an optimized pattern directly onto the membrane surface. The advantages of this design are that (1) no separate feed spacer is needed since the raised features (microstructures) provide separation between and support for the membrane(s); (2) no or limited fouling occurs near the microstructures or in the fluid feed channel, because flow streams and velocity profiles in the channel are increased in a manner that increases turbulence without dead-zoning or sluicing; and (3) the feed channel thickness can be minimized, allowing for a greater total area of membrane material to be contained in an element of a given size/volume.

A filter media according to an exemplary embodiment of the invention includes a first membrane portion having a first surface, a second surface opposite the first surface, and a plurality of raised features formed in a predetermined configuration on at least the first surface of the first membrane portion. When a feed solution flows past the plurality of raised features in a filtration direction, the predetermined configuration of raised features causes dynamic flow characteristics of the feed solution to be enhanced for filtration. Additionally, when a cleaning liquid flows past the plurality of raised features in a cleaning direction, the predetermined configuration causes dynamic flow characteristics of the cleaning liquid to be enhanced for scouring the first membrane portion. The cleaning direction is opposite to the filtration direction.

In a particular embodiment, the filter media further includes a second membrane portion overlying the plurality of raised features of the first membrane portion such that the plurality of raised features defines a feed channel between the first and the second membrane portions. Additionally, the predetermined configuration causes target filter velocity characteristics to be induced in the feed solution when the feed solution flows through the feed channel and causes target scouring velocity characteristics to be induced in the cleaning liquid when the cleaning liquid flows through the feed channel. The target filter velocity characteristics resist fouling of the feed channel due to the feed solution flowing therethrough, and the target scouring velocity characteristics facilitate scouring of the feed channel.

In one more particular embodiment, the feed channel includes an inlet side and an outlet side, the plurality of raised features defines a plurality of diagonal flow paths in the feed channel, and the feed solution has a first velocity near the inlet side when the feed solution is passed through the feed channel from the inlet side to the outlet side. Additionally, the target filter velocity characteristics comprise mid-plane channel velocities of at least one-and-one-half times the first velocity along the majority of the plurality of diagonal flow paths. In a still more particular embodiment, the target filter velocity characteristics comprise mid-plane channel velocities between two and two-and-one-half times the first velocity along the majority of each of the diagonal flow paths. In another still more particular embodiment, the cleaning liquid has a second velocity near the outlet side when the cleaning liquid is passed through the feed channel from the outlet side to the inlet side, and the target scouring velocity characteristics comprise mid-plane channel velocities of at least one-and-one-half times the second velocity along the majority of each of the diagonal flow paths.

In another more particular embodiment, the feed channel includes an inlet side and an outlet side, and the feed solution has a first velocity near the inlet side when the feed solution is passed through the feed channel from the inlet side to the outlet side. Additionally, the target filter velocity characteristics comprise causing each of the plurality of raised features to be encircled by a flow of the feed solution having a velocity of at least one-and-one-half times the first velocity. In a more particular embodiment, the cleaning liquid has a second velocity near the outlet side when the cleaning liquid is passed through the feed channel from the outlet side to the inlet side, and the target scouring velocity characteristics comprise causing each of the plurality of raised features to be encircled by a flow of the cleaning liquid having a velocity of at least one-and-one-half times the second velocity.

In another particular embodiment, the predetermined configuration of raised features comprises a uniform two-dimensional array defining a plurality of rows and a plurality of columns where each successive row of the plurality of rows is offset with respect to a preceding row.

In a more particular embodiment, each of the raised features comprises an apex joining two legs of substantially equal length, and the apex is disposed in a direction opposite the filtration direction. In a still more particular embodiment, each of the raised features comprises a chevron, and in an even still more particular embodiment, the apex has a radius of curvature approximately equal to a length of each of the legs. In an alternative still more particular embodiment, each of the raised features is U-shaped.

In another more particular embodiment, each of the plurality of raised features comprises two legs of substantially equal length, and a diagonal distance between one of the legs of a first feature in a first row and a corresponding one of the legs of a second feature in a second row immediately adjacent to the first row is greater than the leg length. In a still more particular embodiment, each of the plurality of raised features has a maximum width measured in a direction perpendicular to the feed channel, and a distance between the first feature in the first row and a third feature in the first row immediately adjacent to the first feature is greater than the maximum width.

In still another particular embodiment, the first membrane portion is wound around a collection tube defining an axis, and the plurality of raised features defines a spiral feed channel around the collection tube such that the filtration and the cleaning directions are parallel to the axis of the collection tube.

In yet another particular embodiment of the filter media, each of the plurality of raised features defines a cavity, and the cavity is sized to capture a bubble therein, where the bubble has a diameter less than a height of the each of the plurality of raised features.

An exemplary method for manufacturing a filter according to the present invention includes the steps of providing a filter media, forming a plurality of raised features in a predetermined configuration on a first surface of the filter media, and wrapping the filter media around a collection tube to defines a spiral feed channel that extends along an axis of the collection tube and that defines an inlet and an outlet. The predetermined configuration induces desired velocity characteristics in both forward and reverse flow directions through the filter. In particular, the predetermined configuration imparts target filter velocity characteristics to a feed solution when the feed solution is passed through the spiral feed channel from the inlet to the outlet, where the target filter velocity characteristics resist fouling of the feed channel. Additionally, the predetermined configuration imparts target scouring velocity characteristics to a cleaning liquid when the cleaning liquid is passed through the spiral feed channel from the outlet to the inlet, where the target scouring velocity characteristics facilitate scouring of the feed channel.

According to one particular method, the step of forming the plurality of raised features includes printing the plurality of raised features on the first surface of the filter media.

According to another particular method, each of the plurality of raised features defines a cavity, and the cavity is sized to capture a bubble therein where the bubble has a diameter less than a height of the spiral feed channel.

An exemplary method for using a filter module is also disclosed. The method includes the steps of providing a filter module including a filter media having a plurality of raised features formed in a predetermined configuration on a first surface thereof and defining a feed channel through the filter media, passing a feed solution through the feed channel from an inlet to an outlet to filter the feed solution, and scouring the feed channel by passing a cleaning liquid through the feed channel from the outlet to the inlet. The predetermined configuration of the plurality of raised features induces target scouring velocity characteristics in the cleaning liquid within the feed channel. After scouring the method includes the step of again passing feed solution through the feed channel from the inlet to the outlet.

According to a particular method, each of the plurality of raised features defines a cavity, and the step of scouring the feed channel comprises introducing bubbles into the feed channel such that the cavity of at least some of the plurality of raised features temporarily captures at least one of the bubbles. In a more particular method, the step of scouring the feed channel further comprises vibrating the bubbles.

BRIEF DESCRIPTION OF THE DRAWINGS

The present invention is described with respect to the following figures, wherein like reference numbers indicate substantially-similar elements.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. In other instances, particulars of well-known components and manufacturing practices (e.g., assembling a filter module having membrane(s), connecting pumps to the filter module, pressurizing the filter, etc.) have been omitted so as to avoid unnecessarily obscuring the present invention.

Figure 1A:
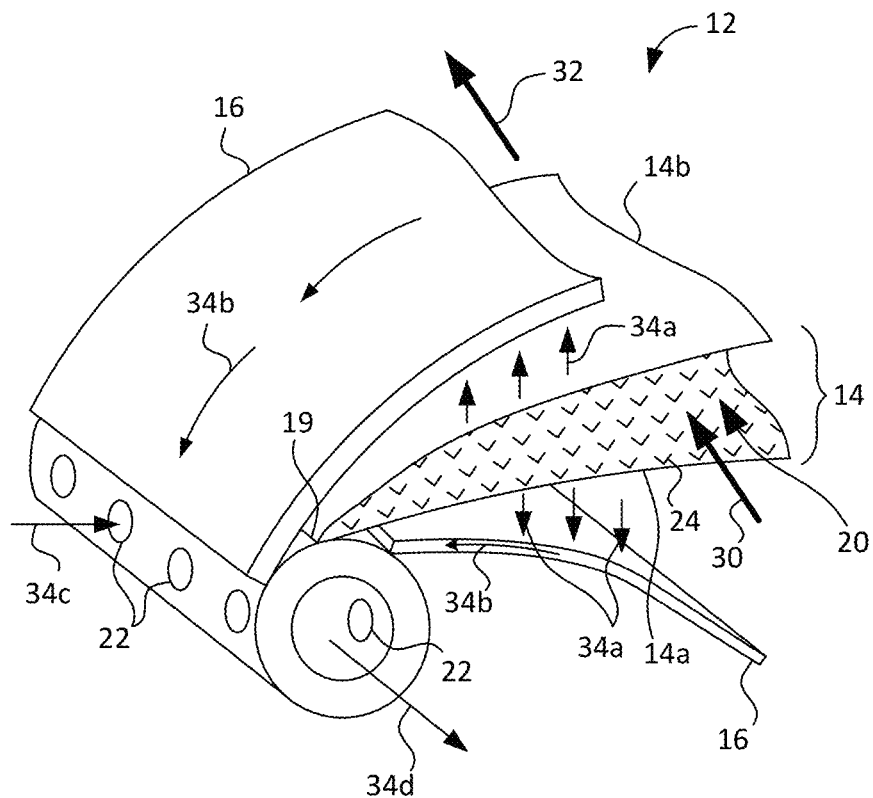
FIGS. 1A-1B are schematic illustrations of a spiral-wound reverse osmosis filter module incorporating a filter membrane according to an embodiment of the present invention.

FIG. 1A depicts, in a simplified and schematic form, pertinent portions of a spiral-wound reverse osmosis (RO) filter module 12 operating in a filtering mode. FIG. 1A, as will be clear to a person of ordinary skill in the art, depicts a filter module 12 in a partially "un-wound" state, for purposes of description. The module 12 has a filter media 14, which is a membrane leaf, and one or more permeate carrier(s) 16 (two shown in this embodiment) which are overlaid with one another and wound together around a center collection tube 18 into a cylindrical shape. Collection tube 18 can be constructed of any appropriate rigid, corrosion-resistant material, such as polypropylene, polyvinyl-chloride (PVC), etc. In this simplified embodiment, only a single membrane leaf 14 is used but, as is well known in the art, multiple membrane leaves 14 (and associated layers of permeate carrier 16) may be wound around a single collection tube 18.

Membrane leaf 14 is comprised of two layers 14a, 14b and is fabricated by folding a single sheet of membrane material over on itself with the active surface inward and the fold-line 19 toward collection tube 18. The thin space between the layers 14a, 14b thereby forms a feed channel 20. Permeate carrier 16 is laid over membrane leaf 14 and water-proof glue (or other adhesive) is applied in lines to the perimeter (except next to collection tube 18) of the top face of the sheet assembly and the assembly is wound tightly around collection tube 18. When completed, the cylindrical filter module 12 presents, when viewed end-on, openings for flow of feed solution to the membrane active surface only through the feed channel 20 (now in spiral) formed between the two layers 14a, 14b of the membrane leaf. The permeate carrier 16 is sealed from the feed solution by the glue lines such that the only path by which permeate can exit the carrier layer is along its innermost edge where it meets the collection tube 18, which has openings 22 in it to accept the permeate.

Figure 2:
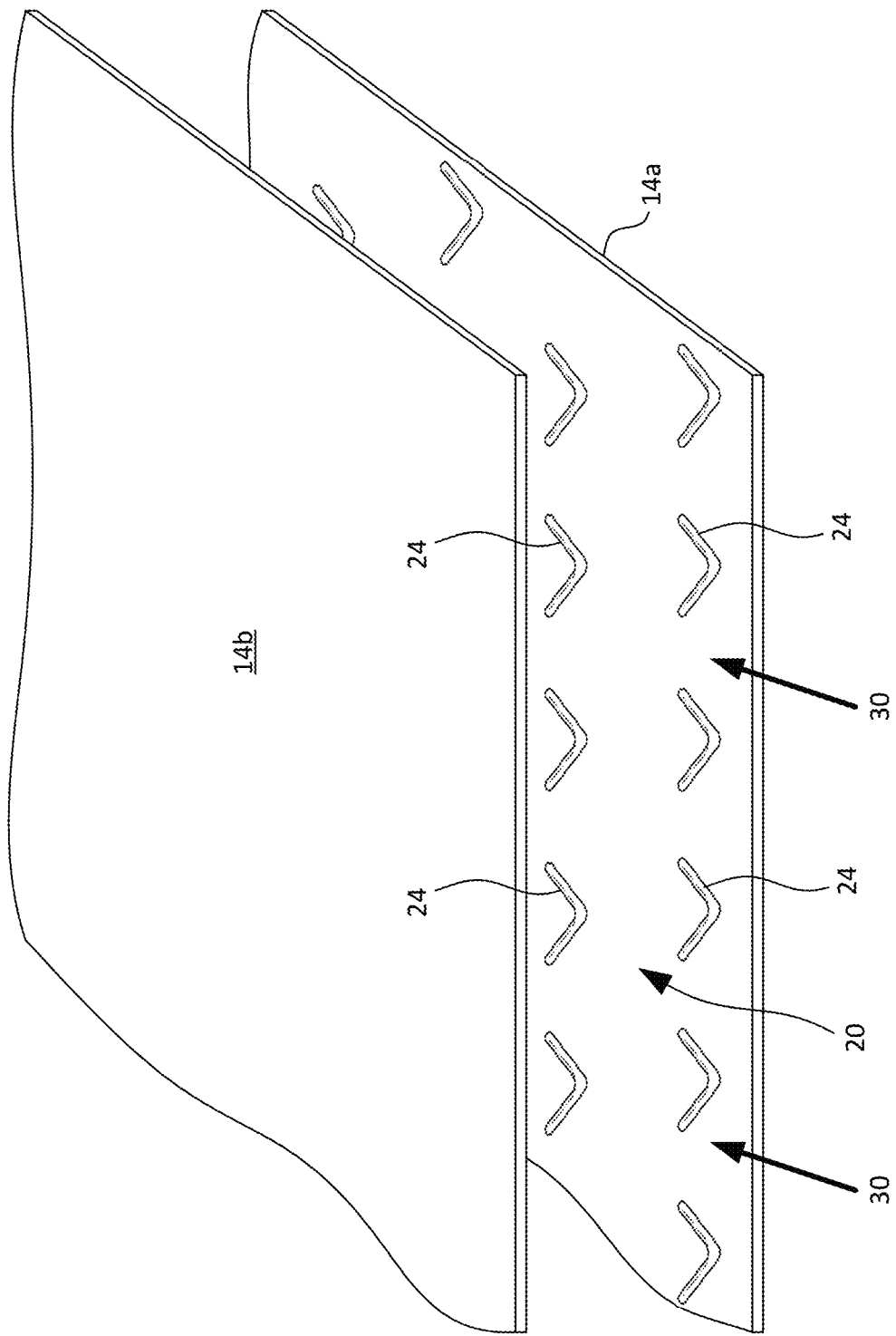
FIG. 2 is a schematic, close-up view of a portion of the filter membrane of FIG. 1.

As best shown in FIG. 2, at least one of the membrane layers 14a, 14b has raised features 24 projecting from its surface by a distance sufficient to maintain a desired minimum spacing between the layers 14a, 14b, thus defining a height of feed channel 20. The features 24 therefore act as integrally-formed "feed channel spacers." Features 24 can (as explained in more detail below) be printed on or embossed on/in membrane layer(s) 14a and/or 14b. Advantages provided by features 24 as compared with a feed channel including a separate mesh layer are (1) they allow for feed channel 20 to be thinner so that more membrane material can be wrapped in a housing having a given diameter, and (2) according to the optimized configurations of the present invention, the features 24 create much less obstruction to the flow of feed solution through the feed channel 20 and, therefore, fewer places for particles and scale to form between the membranes.

Membrane layers 14a, 14b can comprise a polypropylene fiber support sheet covered by a porous polysulfone, which further comprises a cast layer (for example, but not limited to, approximately 0.1 to approximately 1 pm) of a polyamide. Suitable membranes are not, however, limited to the above-named materials, as other materials, e.g., metal, ceramic, sulfonated copolymers, nano-structured materials, carbon nanotube structured materials, etc., can be used with the present invention. In a typical membrane, polyamide forms an active membrane surface, i.e., a layer that is primarily or solely responsible for rejecting total dissolved solids (TDS) from a feed solution and for allowing passage of permeate. Typically, at least one other membrane layer is present for physical support of the active layer.

The permeate carrier 16 can, in one non-limiting example, comprise a thin sheet of highly porous, non-woven fabric made from polypropylene or another appropriate material. Other permeate carriers 16 can also be used.

Again referring to FIG. 1A, feed water 30 (which is assumed to carry a relatively large, and therefore undesirable, amount of TDS) under pressure enters filter element 12 axially, or "edgewise," via an inlet side of feed channel 20 (which is integrated into membrane leaf 14), travels through the feed channel and a majority of feed water 30 flows out of the far end (outlet side) of feed channel 20 as reject (high TDS) solution 32. Since the feed channel 20 is relatively open, the pressure drop from the entrance (upstream) end of the feed channel 20 to the exit (downstream) end of the feed channel 20 is essentially the same. In other words, feed water 30 and reject solution 32 are at approximately the same pressure with minimal pressure drop caused by the features.

As feed water 30 is exposed to the active surfaces of the membrane leaf 14 (that is, the inward-facing surfaces of membrane layers 14a, 14b), water molecules are forced through both of the membrane layers 14b, 14a and ions and/or dissolved solids are rejected to the feed water 30 that continues flowing axially along feed channel 20 and eventually becomes reject water 32. Permeate water 34a is forced through the RO membranes (and therefore now has a lower level of TDS than the feed water 30) enters porous permeate carrier 16 and flows spirally around permeate carrier 16 (as indicated by arrows 34b) until reaching permeate passage holes 22 through which it passes (arrow 34c) into the inside of collection tube 18. This product water (34d) then exits the filter unit 12 through the end of collection tube 18. In operation, the components of FIG. 1 are wrapped tightly into a cylindrical tube and the outside of the assembly is taped (or otherwise secured) to prevent element 12 from unwinding. In operation, element 12 is housed in a pressure vessel (not shown) that can easily withstand the feed pressure. Collection tube 18 is sealed from the pressure vessel so that permeate liquid 34 is not mixed with feed water 30 or reject solution 32.

The active or inward-facing raised features (such as those illustrated in FIG. 2), in addition to acting as feed channel spacers, are known to alter the flow of feed solution passing through the feed channel in the "regular" or "filter" direction in a manner that reduces the likelihood of low flow velocity areas, increases turbulence, and reduces the effects of concentration polarization. The target filter velocity characteristics induced by the features reduce the tendency of the filter to become clogged with debris and/or biofilm during operation of the filter, thereby increasing its service life and/or the amount of water that can be processed before cleaning becomes necessary.

Figure 1B:
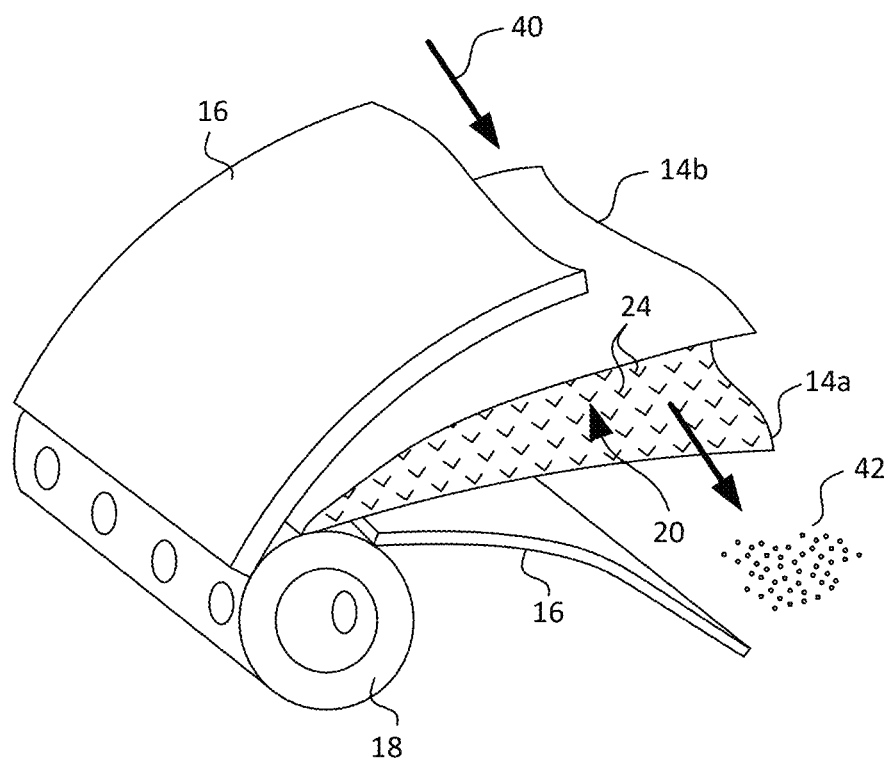

Filter module 12 also periodically undergoes a cleaning operation, as shown in FIG. 1B, in which relatively clean water 40 (or some other cleaning liquid 40 that is unlikely to cause damage to the membrane material) is passed through the filter element 12 in a reverse direction, which is generally opposite to the direction of normal filter flow shown in FIG. 1A. Such a cleaning operation is referred to herein as a "back-flush," and is intended to dislodge and discharge any accumulation of fouling 42 (e.g., particulate matter, scale, bio-film, etc., or some combination thereof) that may have formed in feed channel 20.

The inventor has discovered that by configuring the raised features in an optimized manner they can, in addition to improving the functioning of the filter element during normal operation (as described above), also serve to enhance the effectiveness of a back-flush cleaning operation. The raised features, when configured according to the present invention, induce target scouring velocity characteristics that increase turbulence and scouring of membrane 14 during back-flush. This more effectively cleans the membrane of any undesirable build-up (scale, film, etc.). As used herein in relation to the raised features, the term "configuration" is defined as the combination of (1) the geometry of individual features 24, and (2) the pattern in which a plurality of those features 24 are arranged or disposed over the surface of a membrane.

The invention provides advantages because it provides a filter media that utilizes predetermined configuration(s) of raised features that achieve a desirable balance between (1) preventing fouling in the feed channel 20 during filter operation, and (2) the effective removal of fouling during back-flush cleaning.

Figure 3B:
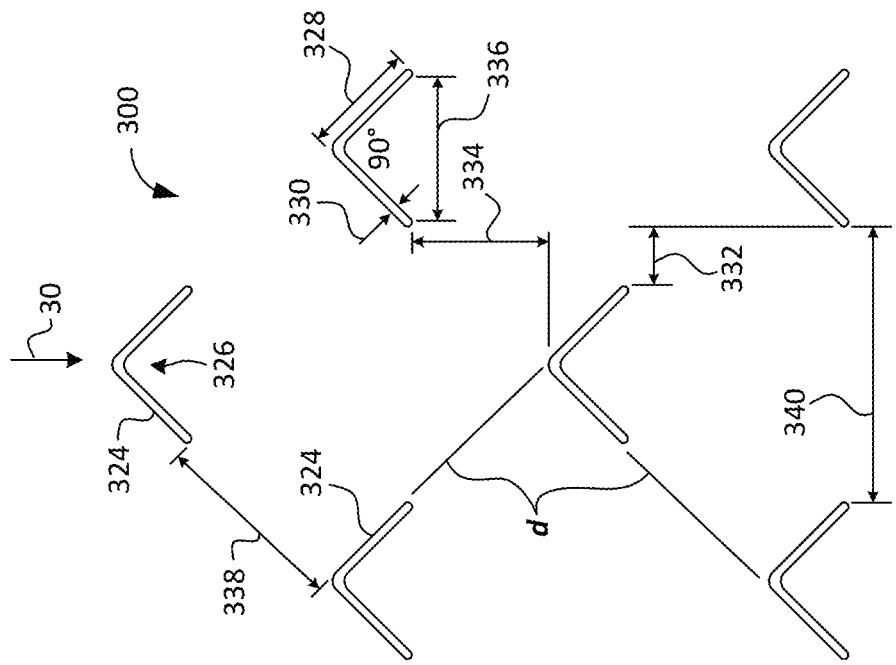
FIG. 3B is a zoomed in view of the predetermined configuration of FIG. 3A.
Figure 3A:
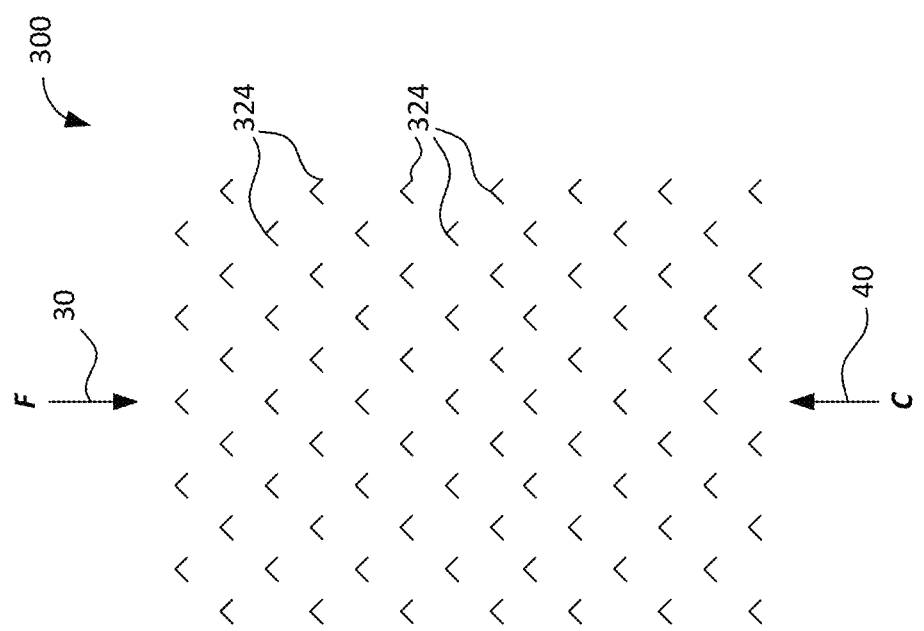
FIG. 3A depicts a first exemplary predetermined configuration of raised features formed on the filter membrane of FIG. 1.

FIGS. 3A and 3B show an exemplary predetermined configuration 300 of raised features 324 that are formed on membrane layer 14a. In this exemplary embodiment, the raised features 324 are formed as chevrons or generally-V-shaped elements. The apex of each chevron 324 points opposite to the direction of regular or filtration flow 30 (as indicated by arrow F) through feed channel 20. The apex of each chevron 324 forms a point or has a small chamfer in this embodiment. Adjacent rows of features are offset from one another in a cross-flow direction, and are approximately evenly spaced from one another. In all of the embodiments discussed and depicted, a row is defined as a line of features extending generally perpendicular to the regular flow, or horizontally as shown if FIG. 3A.

FIG. 3B illustrates exemplary dimensions of each feature/chevron 324. The dimensions are approximate because they will vary somewhat based on the production method (e.g., printing, embossing, etc.) that is used. More particularly, each feature 324 has an interior angle 326 on the order of 90°, a leg length 328 of approximately 3.0 mm, and a leg width 330 of approximately 0.5 mm. The chevrons 324 are arranged in a uniform pattern with a lateral spacing 332 between the end of a leg of a chevron 324 and the closest end of the leg of a chevron 324 in the next row of approximately 0.76 mm, and a "tip-to-tail" spacing 334 (measured parallel with the flow axis) of approximately 2.5 mm. The maximum leg-to-leg width 336 of each chevron 324 is approximately 3.5 mm.

The chevrons 324 are also in diagonal alignment with one another across all rows and columns, as indicated by the diagonal alignment lines/directions d. Diagonal spacing 338 along the directions d between chevrons 324 of adjacent rows is approximately 4.1 mm, and the (narrowest) horizontal spacing 340 between nearest legs of adjacent chevrons 324 in the same row is approximately 6.5 mm. The vertical spacing 342 between aligned chevrons 324 of every other row is approximately 9.3 mm.

Note that the dimensions provided above are approximate dimensions and can change without departing from the scope of the present invention. For example, the leg width 330 might be reduced further (e.g., to 0.1 mm, etc.) or thickened slightly depending on the ink used to print chevrons 324. As another note, it should be reiterated that the drawings herein are not to scale.

Predetermined configuration 300 induces target filter velocity characteristics in the feed solution 30 flowing through feed channel 20 in the filtration direction F. In particular, the target filter velocity characteristics described herein are desirable because they resist fouling of the feed channel 20 during filtering. Moreover, predetermined configuration 300 further induces target scouring velocity characteristics in the cleaning liquid 40 flowing through feed channel 20 in the reverse/cleaning direction C. The target scouring velocity characteristics advantageously facilitate improved scouring of feed channel 20.

Figure 4A:
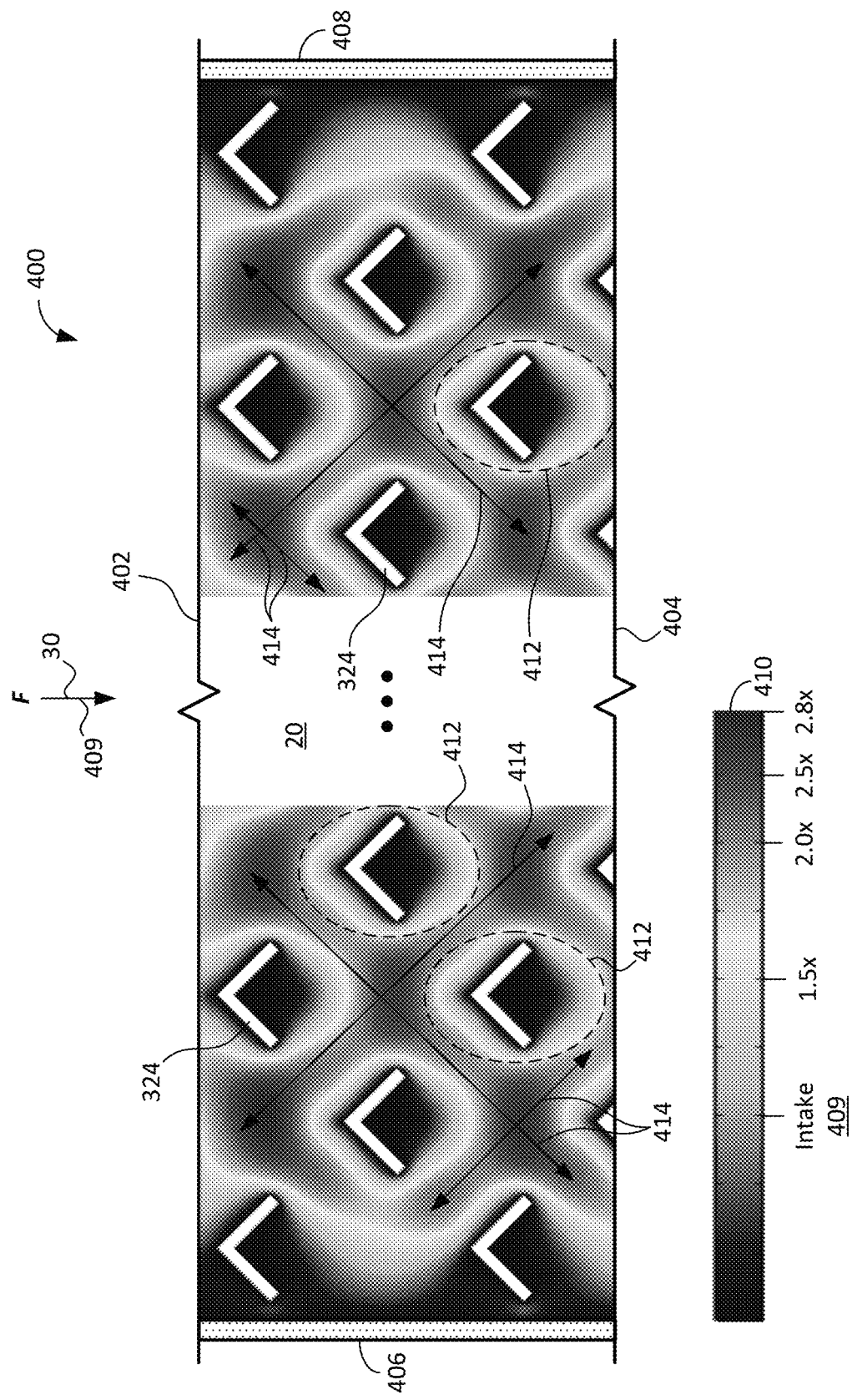
FIG. 4A is a velocity map of a feed solution passing through a portion of the feed channel of the filter module of FIG. 1 in a filtering direction.

FIG. 4A is a velocity map 400 showing velocities of a feed solution 30 passing through a portion of feed channel 20 from an inlet side 402 to an outlet side 404. Feed channel 20 includes chevrons 324 and is bounded on the left and right sides by seals (e.g., glue lines, etc.) 406 and 408, respectively. Feed solution 30 enters feed channel 20 with some mean intake velocity 409 (e.g., around 0.10 m/s, etc.), moves through feed channel 20, and then exits the outlet side of feed channel 20 at generally the same mean velocity as the intake velocity due to the inlet and outlet sides of filter 12 being at generally the same pressure. However, predetermined configuration 300 of the chevrons 324 causes feed solution 30 to increase in velocity in desirable ways across the majority of feed channel 20 between seals 406 and 408. Accordingly, FIG. 4A shows velocities of feed solution 30 as multiples of the intake velocity 409 as indicated by the legend 410. It should be noted that velocity map 400 shows mid-channel velocities of feed solution 30 as it passes through feed channel 20. Mid-channel velocities are velocities that occur away from the permeable surfaces of membrane layers 14a and 14b. FIG. 4A shows mid-channel velocities that occur in a plane down the middle of feed channel 20.

Velocity map 400 shows that chevrons 324 induce desirable filter velocity characteristics into feed solution 30 within feed channel 20. For example, the majority of chevrons 324 (with the exception of those nearest seals 406 and 408) are encircled (girdled) by regions 412 of feed solution 30 having velocities of at least 1.5 times the intake velocity 409. Thus, each of such chevrons 324 is protected against fouling by these velocity regions. Moreover, the velocity profiles of feed solution 30 along the diagonals 414 of the array of chevrons 324 indicate velocities of at least 1.5 times the intake velocity 409, and in most areas velocities of at least 2.0 times to more than 2.5 times the intake velocity 409 can be expected in the diagonal directions 414. In other words, the velocity profiles along diagonal directions 414 are generally uniform through diagonal feed paths in feed channel 20. Notably, however, diagonal velocities 414 generally do not exceed a multiple of more than three times the intake velocity 409 where the inventor has determined that excessive turbulence begins to occur. Such filter velocity characteristics indicate that feed solution 30 is being distributed between chevrons 324 of the same row (through spacing 340) and between chevrons 324 of adjacent rows (through diagonal spacing 338) at a fast rate, which reduces fouling of feed channel 20. This is due to some nozzle effect between chevrons 324, but also because the spacings/gaps 338 and 340 between chevrons 324 encourage extended, uniform laminar velocity profiles rather than velocity restrictions and associated turbulence.

Figure 4B:
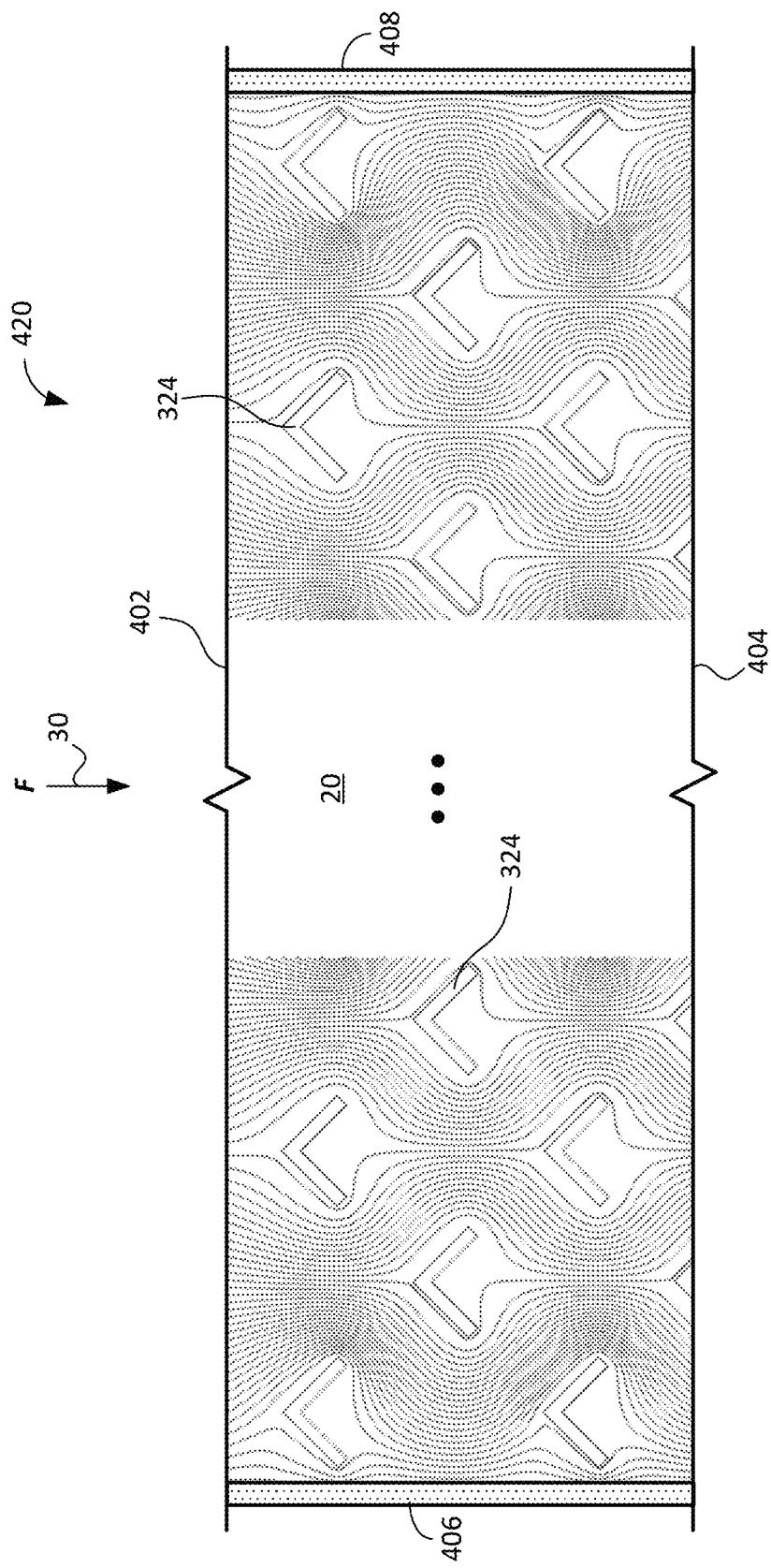
FIG. 4B is a fluid flow map showing fluid flow profiles of the feed solution passing through the feed channel of the filter module of FIG. 1 in the filtering direction.

FIG. 4B is a fluid flow map 420 that shows fluid flow profiles within feed channel 20 for feed solution 30. (Note that FIG. 4A is indicative of velocity profiles but not necessarily individual fluid streams.) As shown, despite the higher velocity regions within feed channel 20 (FIG. 4A), the fluid flow in feed channel remains generally laminar with minimal to no swirling or recirculation zones. Minimizing swirling and recirculation zones is beneficial because such zones contribute to fouling due to water stagnation and sluicing effects that deposit and retain fouling in such zones.

Figure 4C:
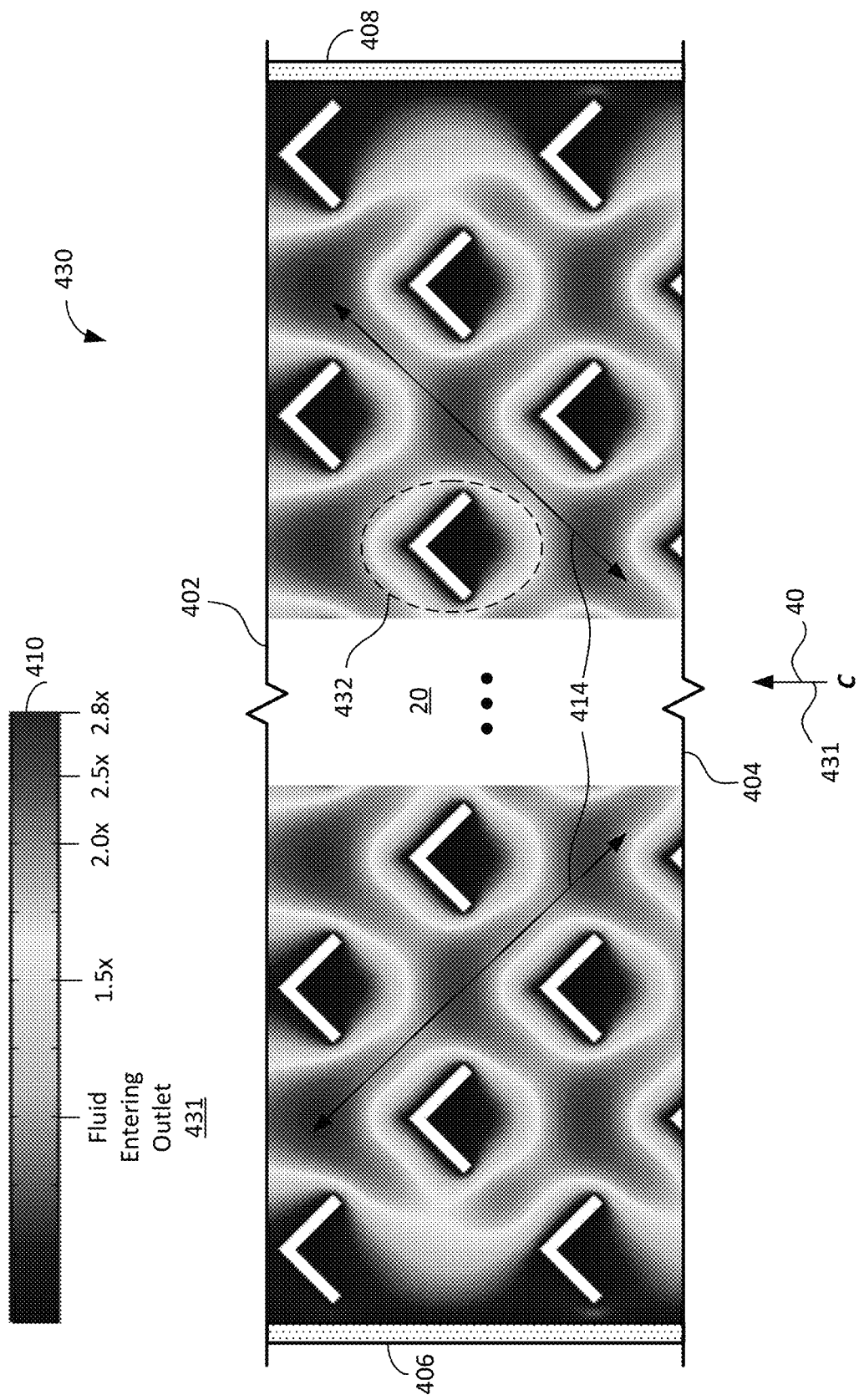
FIG. 4C is a velocity map of a cleaning liquid passing through a portion of the feed channel of the filter module of FIG. 1 in a cleaning (flush) direction.

FIG. 4C is a velocity map 430 showing velocities of a cleaning liquid 40 passed through feed channel 20 in a flush (reverse) direction from the outlet side 404 to the inlet side 402 of feed channel 20. Commonly, a mean velocity 431 at which cleaning liquid 40 is introduced to feed channel 20 is the same or near the same as the mean intake velocity 409 for feed solution 30 (e.g., 0.10 m/s, etc.). This is because, the process equipment for the feed direction is used to also flush filter 12. Additionally, introducing cleaning liquid 40 at too high of a velocity can cause the filter module 12 damage (e.g., due to telescoping of membrane 14, etc.).

Velocity map 430 shows that predetermined configuration 300 of chevrons 324 further induces target scouring velocity characteristics into a cleaning liquid 40 (e.g., water) passing through feed channel 20 in the reverse direction. Similar to forward flow, the majority of chevrons 324 (with the exception of those nearest seals 406 and 408) are encircled (girdled) by regions 432 of cleaning liquid 40 having velocity of at least 1.5 times the mean velocity 431 at which cleaning liquid 40 is introduced to feed channel. Accordingly, any fouling that has built up near chevrons 324 is scoured by these velocity regions, due to the fluid flow being in the reverse direction. Moreover, velocity profiles along the diagonals 414 of the array of chevrons 324 are again at least 1.5 times the velocity 431 at which cleaning liquid 40 is introduced to feed channel 20, and in many cases is 2.0 to more than 2.5 times the introduction velocity 431. Such velocity profiles indicate that cleaning liquid 40 is scouring effectively between chevrons 324 of the same row and adjacent rows. Additionally, the size of gaps 338, 340 between adjacent chevrons 324, and the multiplied velocity profiles, enable fouling particulates 42 to be carried out of feed channel 20. Thus, predetermined configuration 300 enables feed channel 20 to be effectively scoured and cleaned simply by introducing cleaning liquid 40 in the reverse/flush direction at approximately the same velocity as intake velocity 409 used during filtering.

Figure 4D:
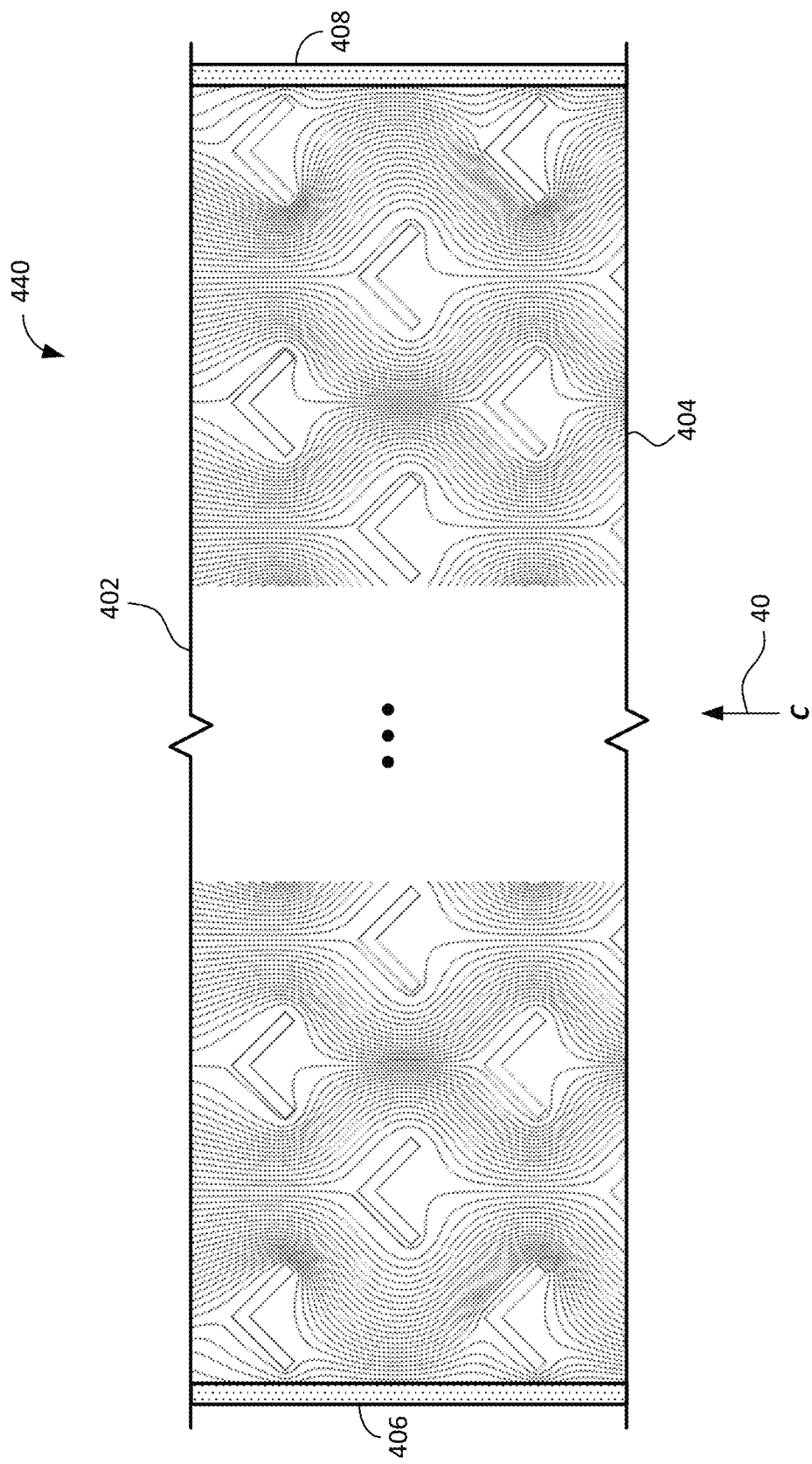
FIG. 4D is a fluid flow map showing fluid flow profiles of the cleaning liquid passing through the feed channel of the filter module of FIG. 1 in the cleaning direction.

FIG. 4D is a fluid flow map 440 that shows fluid flow profiles within feed channel 20 for cleaning liquid 40 in the flush direction. Again, despite higher velocity regions within feed channel 20 in the flush direction, the fluid flow in feed channel 20 remains generally laminar with little to no swirling or recirculation. This optimization promotes fouling to be readily scoured and carried out of feed channel 20.

Counterintuitively, predetermined configuration 300 of raised features 324 of the present invention is optimized to achieve a desired balance between (1) fouling of the feed channel during normal operation and (2) the effective removal of fouling in the reverse flow direction. This involves configuring the array of chevrons 324 to maximize the mid-channel fluid velocities around all sides of the raised features 324, while also maintaining flow that minimizes or eliminates swirling and recirculation zones. Flow velocities do not have to be the maximum obtainable and turbulent, because the predetermined configuration 300 facilitates a velocity map 400 that inhibits excessive fouling in the filtering direction due to uniform high velocities surrounding the chevrons 324 (e.g., along diagonals 414). Additionally, the predetermined configuration 300 facilitates velocity map 430, which facilitates effective scouring velocities around chevrons 324. Maintaining a substantially uniform velocity map 400 within the middle of feed channel 20 (as opposed to near the membrane surfaces) also reduces concentration polarizations near the membranes because fluid flow velocity is consistently high, and swirling and recirculation zones are minimized as indicated in FIG. 4B, across the majority of feed channel 20.

Figure 5:
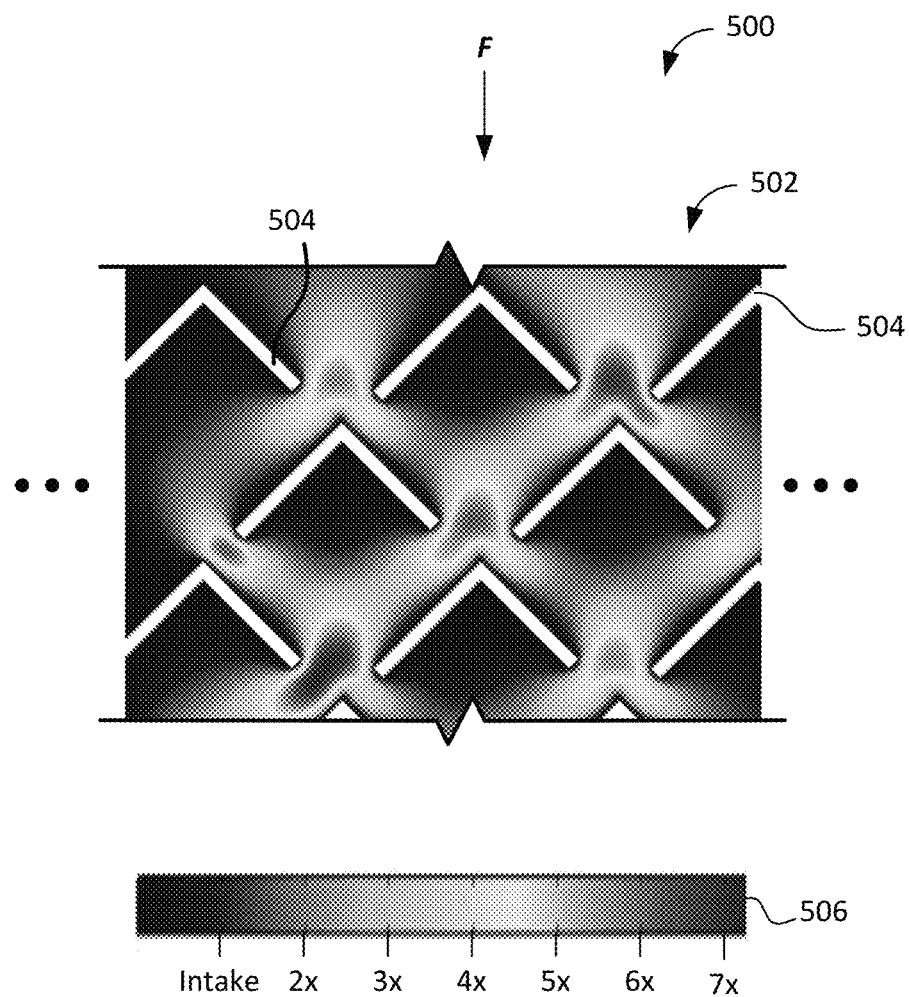
FIG. 5 shows a velocity map 500 of a feed solution passing through a portion of a feed channel that is not optimized according to principles of the present invention.

In contrast, FIG. 5 shows a velocity map 500 for a configuration 502 of features 504 that is not optimized according to the principles of the present invention. In particular, the distances between adjacent chevrons 504 are narrow (e.g., by making the chevrons larger), which creates nozzle effects and higher velocities between the features. While initially this might seem beneficial due to the higher localized velocities, the non-optimized configuration 502 actually creates both more stagnant regions between the localized higher velocities (dark), as well as, very turbulent regions within the high-velocity localizations of more than seven times the intake velocity, as indicated by legend 506. Both conditions promote excessive fouling due to low velocities and sluicing, respectively.

Figure 6B:
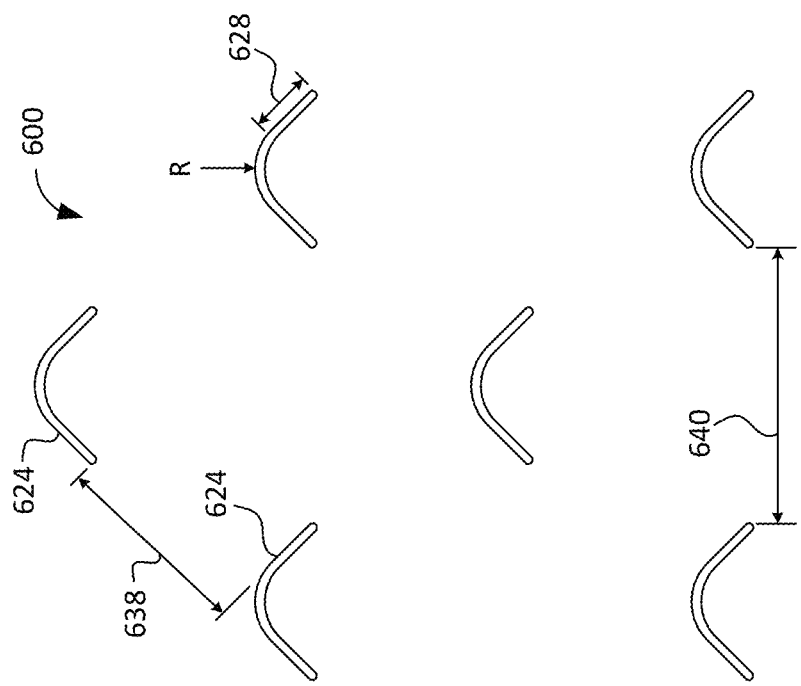
FIG. 6B is a zoomed in view of the second predetermined configuration of FIG. 6A.
Figure 6A:
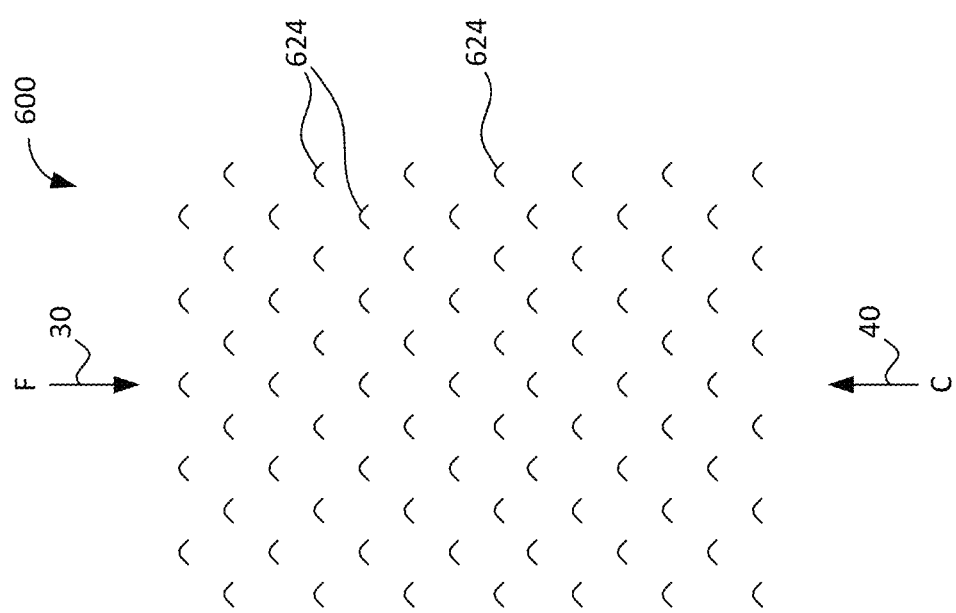
FIG. 6A depicts a second exemplary predetermined configuration of raised features formable on the filter membrane of FIG. 1.

FIGS. 6A and 6B show a second predetermined configuration 600 of raised feature 624 according to the present invention. Raised features 624 are generally V-shaped, but the apexes of the features are somewhat rounded or "blunted." This change from the sharper apex of the features 324 of FIGS. 3A and 3B can make it easier to clean out fouling deposits that form on the back surface (within the cavity) of raised features 624, because there is gradual, concave curve rather than a sharper corner. Each blunted chevron 624 has an interior angle 626 on the order of 90° and a radius of curvature, R, which is approximately equal to the length 628 of each leg. Additionally, like configuration 300, a diagonal spacing 638 between legs of features 624 of adjacent rows is again greater than the leg length 628, and the horizontal spacing 640 is greater than the maximum width of each feature 624.

Figure 7B:
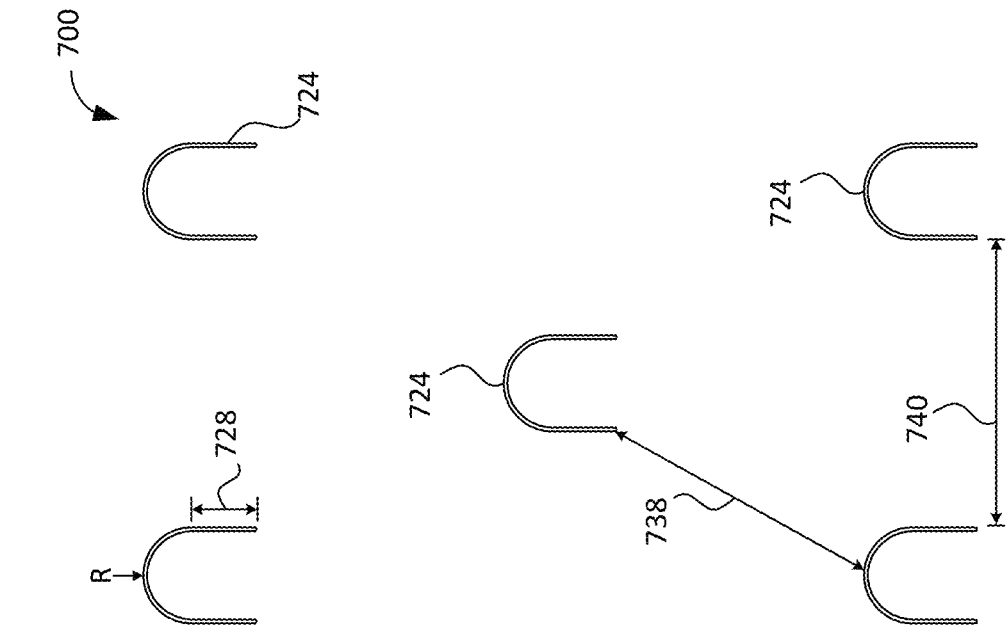
FIG. 7B is a zoomed in view of the predetermined configuration of FIG. 7A.
Figure 7A:
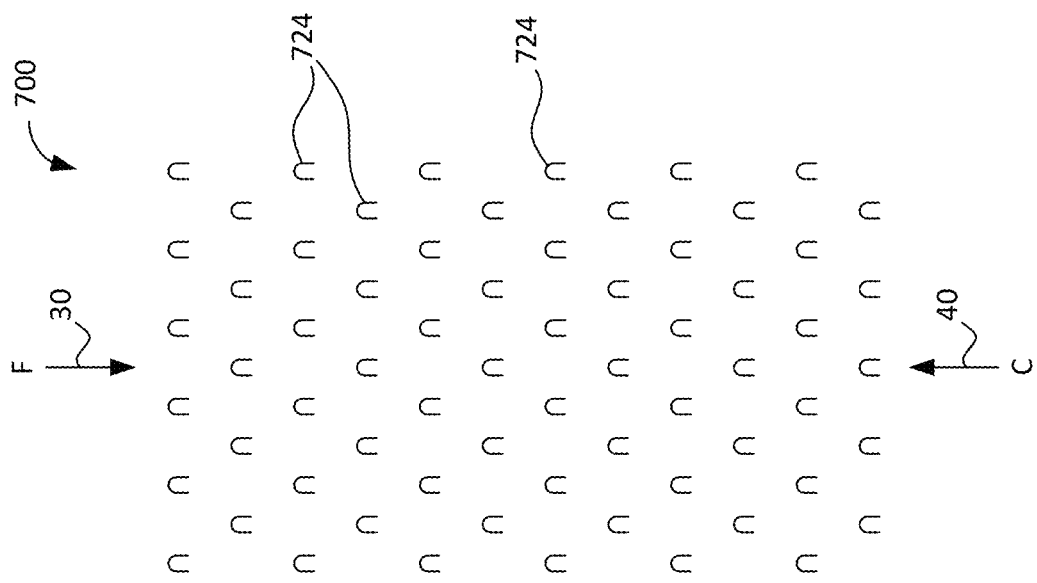
FIG. 7A depicts a third exemplary predetermined configuration of raised features formable on the filter membrane of FIG. 1.

FIGS. 7A and 7B show a third predetermined configuration 700 of an array of raised features 724 that are generally U-shaped. The closed or curved end of each feature 724 is oriented opposite to the direction of regular or filtration flow (as indicated by arrow F) through the feed channel, and the legs extend therefrom in the filtration direction F. Again, the features of adjacent rows are offset from one another in a uniform array. The shape of features 724 can be useful for retaining/generating a bubble in the U-shaped cavity of feature 724 (e.g., during a flush, during filtering, etc.) Like configuration 300, a diagonal spacing 738 between legs of features 724 of adjacent rows is again greater than the leg length 728, and the horizontal spacing 740 is greater than the maximum width of each feature 724.

Membranes having the disclosed configurations can be produced using a high-precision 3D printer such as those manufactured by BioBots Inc. or owned by Aqua Membranes LLC. A suitable ink for making the raised features is Master Bond UT15TK epoxy, which is high strength, moderate viscosity, and UV-curable. This epoxy has been found to be suitable for printing raised features and maintaining membrane integrity.

Nevertheless, it should be understood that the terms "print," "printed" and "printing" refer to processes such as, but not limited to, ink-jet printing, off-set printing and stereolithography (or stereolithographic printing). These methods of printing use printing material, which includes, but is not limited to, "ink," which refers to a variety of materials, including, but not limited to, polymers, thermopolymers, and/or radiation curable polymers. In general, these inks are compatible with at least one of the aforementioned printing methods, or equivalent printing methods thereof.

It should also be noted that the raised features discussed herein may be formed on both layers 14a, 14b of a leaf 14 so that the features interleave with one another when the layers are folded over on one another. But such a construction may lead to the difficulty of achieving proper spacing between the features, and therefore it is believed to be more practical to construct a leaf 14 having raised features on only one of the component layers, in this case layer 14a. As yet another example, a leaf 14 need not necessarily include two layers 14a and 14b but can, instead, include only one layer (layer 14a) that is wrapped with a one or more permeate carriers around a collection tube. These and other modifications are within the scope of the present invention.

Figure 8A:
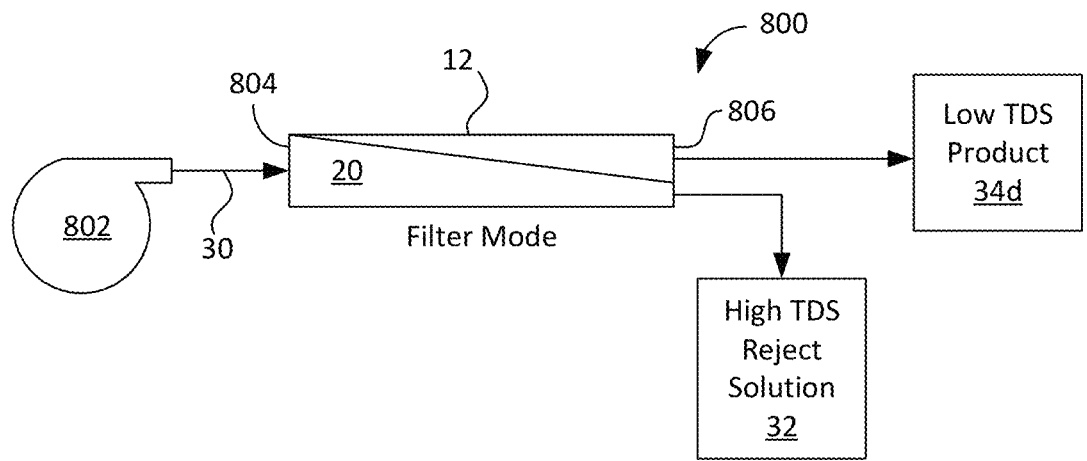
FIG. 8A is a schematic diagram showing the filter module of FIG. 1 operating in a filter mode.

FIG. 8A is a schematic diagram 800 showing RO filter module 12 operating in a filter mode to desalinate high-TDS feed solution 30. A pump 802 is coupled to supply a high-TDS feed solution 30 under pressure to an inlet 804 of filter module 12. Filter module 12 includes a feed channel 20 that conveys feed solution 30 under pressure between its inlet 804 and its outlet 806. The filter media 14 of filter module 12 separates permeate 34a from feed solution 30. Rejected feed solution 32 exits feed channel 20 and is discarded or provided to subsequent processing. Low TDS permeate 34d exits filter module 12 via tube 18 to storage, to further process, to a potable water supply, etc.

Because the filter media 14 of filter module 12 includes a predetermined configuration of raised features formed thereon (e.g., predetermined configuration 300, etc.), filter media 14 imparts target feed velocity characteristics into the feed solution 30 flowing there through. Accordingly, filter media 14 is resistant to fouling and is able to filter permeate for an extended period of time relative to filter modules with prior art feed spacers (e.g., mesh-type, etc.) before becoming fouled.

Figure 8B:
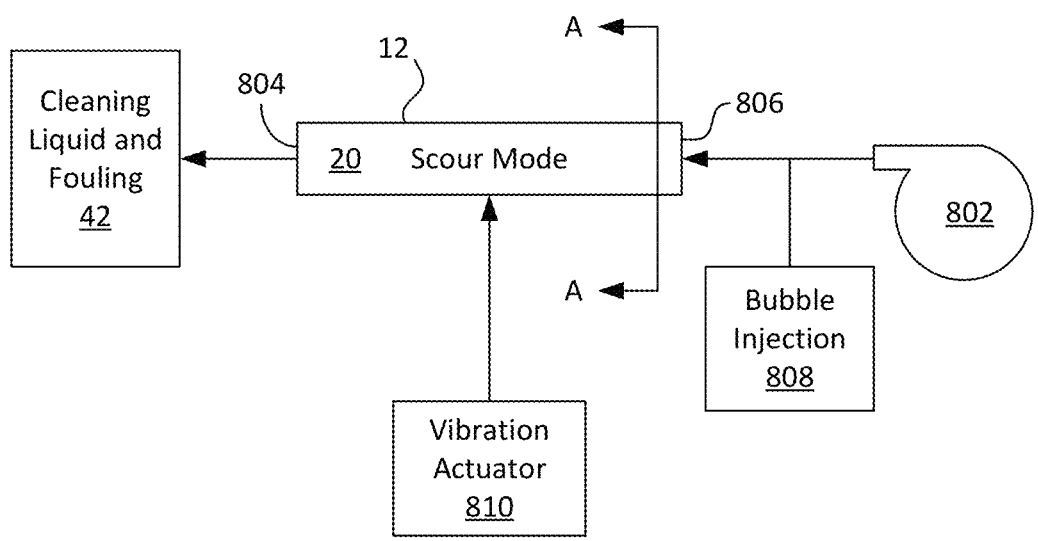
FIG. 8B is a schematic diagram showing the filter module of FIG. 1 operating in a scouring mode and facilitating bubble injection.

When it is determined that filter module 12 is fouled (e.g., as indicated by a pressure change across filter module 12, etc.), filter module 12 is placed in scour mode as shown in FIG. 8B. In scour mode, pump 802 delivers a cleaning liquid 40 to the outlet side 806 of filter module 12. The cleaning liquid 40 flows through feed channel 40, is imparted with target scouring velocity characteristics by the predetermined configuration of raised features of filter media 14, and efficiently scours membrane layers 14a, 14b of filter media 14. Cleaning liquid and fouling 42 are discharged from filter module 12. Fouling particulates are able to escape filter media 14 because of the larger fluid paths between raised features 324 of filter media 14 and because of the uniform, multiplied velocity profiles through the raised features 324.

Optionally, a bubble injection mechanism 808 (e.g., a small diameter nozzle or set of nozzles, etc.) can inject bubbles into feed channel 20 such that the bubbles are captured by the raised features 324. A vibration actuator 810 (e.g., a piezoelectric transducer, a mechanical vibrator, etc.) can then be actuated to cause the bubbles in the feed channel 20 to vibrate. This vibration action can advantageously further scour the feed channel 20 and the cavities of raised features 324.

Figure 9A:
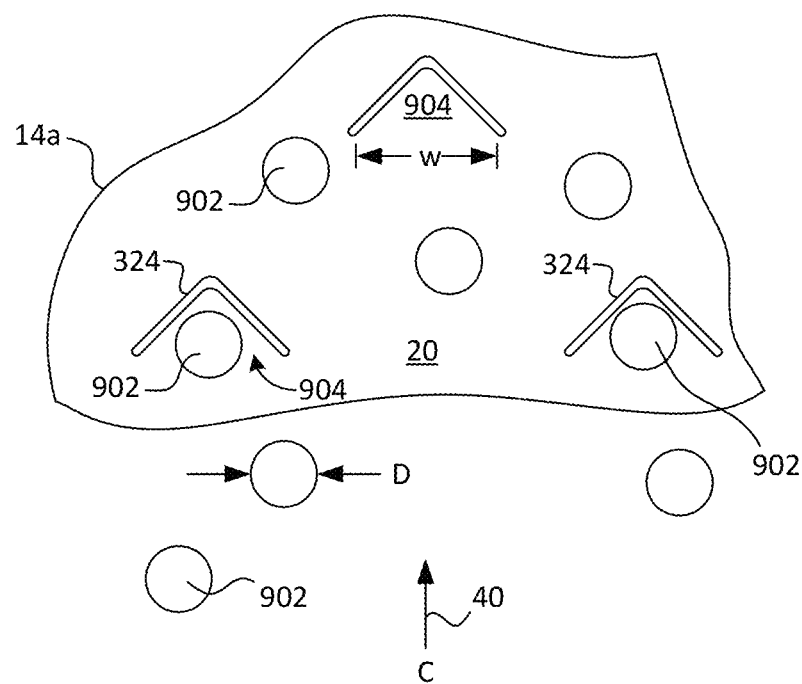
FIG. 9A is a schematic diagram showing bubbles entering the feed channel of the filter media of FIG. 1.

FIG. 9A is a schematic diagram showing bubbles 902 entering feed channel 20 from outlet side 806 of filter media 12. Raised features 324 provide an advantage in that each raised feature 324 is able to catch one or more bubbles 902 within its cavity 904. As a cavity 904 fills with a bubble, subsequent bubbles 902 traveling up feed channel 20, glancing off the filled cavity 904 and travel further up feed channel 20. Accordingly, bubbles 902 propagate up the length of feed channel toward inlet end 804 such that the length of feed channel 20 can be better scoured when the bubbles 902 are oscillated. Here, the bubbles 902 have a diameter D that is less than the maximum interior width of a cavity 904 (i.e., the distance between the legs of chevron 324). Accordingly, at least one bubble 902 can "park" in a feature's cavity for scouring. When the filter module is returned to filter mode (FIG. 8A), any bubbles 902 will flow out of filter module 12.

Figure 9B:
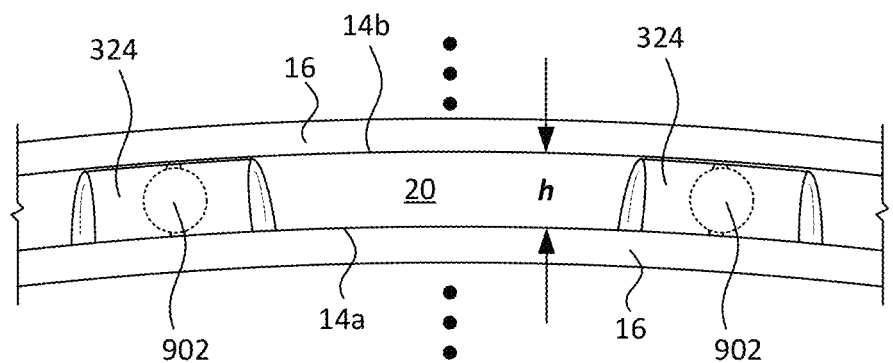
FIG. 9B is a cross-sectional view showing a portion of the feed channel of the filter media of FIG. 1.

FIG. 9B shows a cross-section of a portion of feed channel 20 taken along line A-A of FIG. 8B. Those skilled in the art will recognize that feed channel 20 will actually be a continuous spirally-wound channel. However, only a portion of feed channel 20 is shown here for simplicity. As shown in FIG. 9B, the height of raised features 324 define a height, h, of feed channel 20. As such, FIG. 9B also shows that the diameter of the bubbles 902 introduced to feed channel are less than the height, h. Advantageously, features 324 of feed channel 20 enables bubbles 902 to flow feed channel 20 without cavitation and the associated damage to membrane 14. In a particular embodiment, the height of raised features 324, and thus the height h of feed channel 20, is in the range of 0.25 mm to 0.76 mm (0.010 in. to 0.030 in.). In a more particular embodiment, the height of each of the raised features 324, and the thus the height h of feed channel 20, is approximately 0.51 mm (0.020 in.).

Exemplary methods of the present invention will now be described with reference to FIGS. 10 and 11. For the sake of clear explanation, these methods might be described with reference to particular elements or modules of the foregoing description. However, it should be noted that other elements or modules, whether explicitly described herein or created in view of the present disclosure, can be substituted for those referenced without departing from the scope of the present invention. Accordingly, the methods of the present invention are not limited to any particular element(s) that perform(s) any particular functions. Furthermore, the steps of the methods presented herein need not necessarily occur in the order shown and/or some steps might occur simultaneously. These and other variations of the disclosed methods will be readily apparent in view of this disclosure and are considered to be within the scope of the invention.

Figure 10:
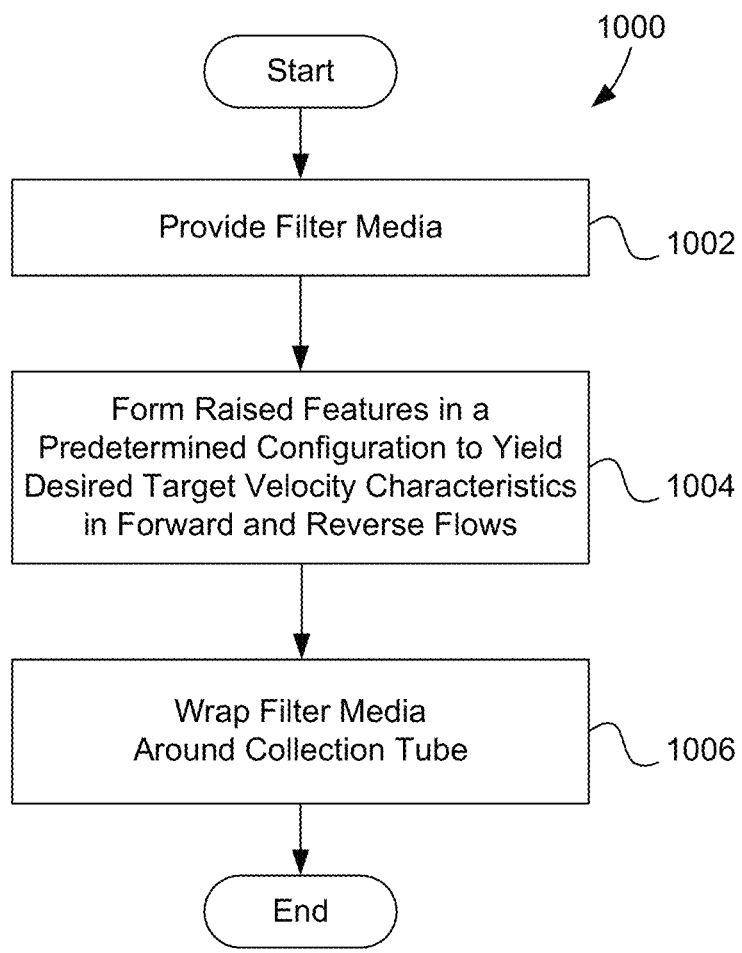
FIG. 10 is a flowchart summarizing an exemplary method for manufacturing a filter module according to the present invention.

FIG. 10 is a flowchart summarizing a method 1000 for manufacturing a filter module 12 according to the present invention. In a first step 1002, a filter media 14 is provided. In a second step 1004, a plurality of raised feature 324 are formed in a predetermined configuration on a first surface 14a of the filter media 14. In a third step 1006, the filter media is wrapped around a collection tube 18 to define a feed channel 20, which extends along an axis of the collection tube and defines an inlet and an outlet. Additionally, the predetermined configuration facilitates target velocity characteristics to be imparted to the fluid in both the forward and reverse flow directions through the filter module 12. More particularly, the predetermined configuration imparts target filter velocity characteristics to a feed solution 30 passed through the feed channel 20 from the inlet to the outlet. Additionally, the predetermined configuration imparts target scouring velocity characteristics to a cleaning liquid 40 passed through the spiral feed channel 20 from the outlet to the inlet.

Figure 11:
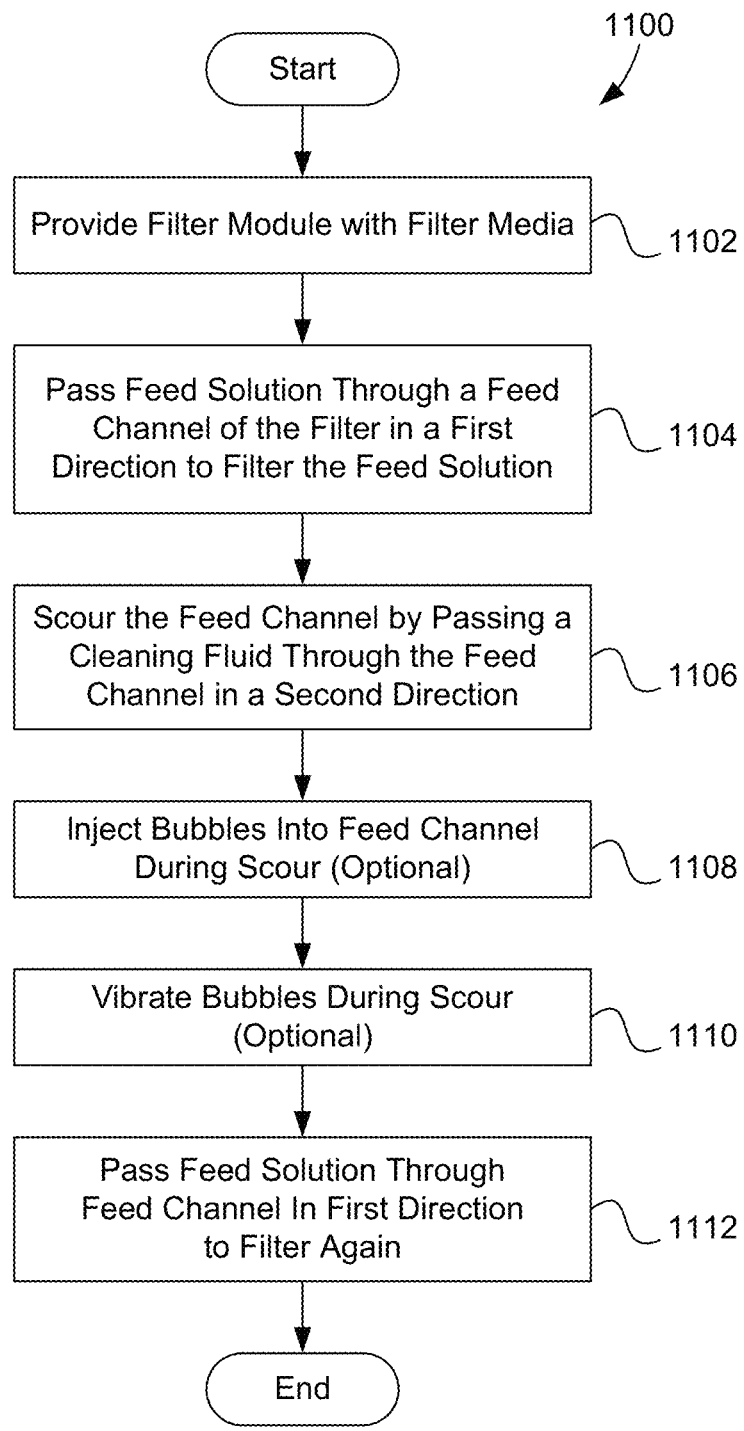
FIG. 11 is a flowchart summarizing an exemplary method for using a filter module according to the present invention.

FIG. 11 is a flowchart summarizing a method 1100 for using a filter module 12 according to the present invention. In a first step 1102, a filter module 12 with a filter media 14 is provided. The filter media 14 includes a plurality of raised features 324 formed in a predetermined configuration 300 on a first surface thereof. The plurality of raised features 324 define a feed channel through the filter media. In a second step 1104, a feed solution 30 is passed through the feed channel 20 in a first direction to filter the feed solution 30. In a third step 1106, the feed channel 20 is scoured by passing a cleaning fluid 40 through the feed channel 20 in a reverse direction, such that the plurality of raised features 324 induce scouring velocity characteristics in the cleaning fluid 40 within the feed channel 20. In an optional fourth step 1108, bubbles 902 are injected into the feed channel as part of the scouring process, and in an optional fifth step 1110, the bubbles 902 are vibrated to assist in scouring. In a sixth step 1112, feed solution 30 is again passed through the feed channel 20 in the first direction to filter the feed solution.

While exemplary embodiments are described above, it is not intended that these embodiments describe all possible forms of the invention. Rather, the words used in the specification are words of description rather than limitation, and it is understood that various changes may be made without departing from the spirit and scope of the invention. For example, the optimized configurations of features discussed herein can be used in other types of filter membranes besides RO. As another example, the filter media need not necessarily be wound around a central collection tube, but can be embodied in a filter module with a flat flow channel. These and other alterations are possible. Additionally, the features of various implementing embodiments may be combined to form further embodiments of the invention.

I claim:

1. A filter media comprising:
   a first membrane portion having a first surface and a second surface opposite said first surface; and
   a plurality of raised features formed in a uniform two-dimensional array on at least said first surface of said first membrane portion, said plurality of raised features being formed in a predetermined configuration defining a plurality of rows and a plurality of columns; and wherein
   each successive row of said plurality of rows is offset with respect to a preceding row;
   each of said plurality of raised features comprises an apex joining two legs of substantially equal length;
   each of said legs of each of said plurality of raised features has a same predetermined leg length;
   each of said plurality of raised features has a maximum width measured in a row direction;
   said plurality of raised features includes a first raised feature disposed in a first row of said array;
   said plurality of raised features includes a second raised feature disposed in a second row of said array, said second row of said array being disposed immediately adjacent to said first row of said array;
   said plurality of raised features includes a third raised feature disposed in said first row of said array, said third feature being disposed immediately adjacent to said first raised feature;
   a shortest diagonal distance between a distal end of one of said legs of said first feature and the apex of said second feature is greater than said same predetermined leg length;
   a narrowest distance between said first feature and said third feature is greater than said maximum width;
   said first membrane portion is wound around a collection tube defining an axis;
   said plurality of raised features defines a spiral feed channel around said collection tube and parallel to said axis, said feed channel having an inlet side to receive feed solution near a first end of said collection tube and an outlet side to expel reject feed solution near a second end of said collection tube; and
   said apex of each of said plurality of raised features points toward said first end of said collection tube.

2. The filter media of claim 1, further comprising:
   a second membrane portion overlying said plurality of raised features of said first membrane portion, said plurality of raised features defining a feed channel between said first and said second membrane portions; and wherein
   said plurality of raised features having said predetermined configuration causes target filter velocity characteristics to be induced in said feed solution when said feed solution flows through said feed channel, said target filter velocity characteristics resisting fouling of said feed channel due to said feed solution flowing therethrough; and
   said plurality of raised features having said predetermined configuration causes target scouring velocity characteristics to be induced in a cleaning liquid when said cleaning liquid flows through said feed channel from said outlet side to said inlet side, said target scouring velocity characteristics facilitating scouring of said feed channel.

3. The filter media of claim 2, wherein:
   said plurality of raised features defines a plurality of unobstructed diagonal flow paths in said feed channel;
   said feed solution has a first velocity near said inlet side when said feed solution is passed through said feed channel from said inlet side to said outlet side; and
   said target filter velocity characteristics comprise mid-plane channel velocities of at least one-and-one-half times said first velocity along the majority of each of said diagonal flow paths.

4. The filter media of claim 3, wherein said target filter velocity characteristics comprise mid-plane channel velocities between two and two-and-one-half times said first velocity along the majority of each of said diagonal flow paths.

5. The filter media of claim 3, wherein:
   said cleaning liquid has a second velocity near said outlet side when said cleaning liquid is passed through said feed channel from said outlet side to said inlet side; and
   said target scouring velocity characteristics comprise mid-plane channel velocities of at least one-and-one-half times said second velocity along the majority of each of said diagonal flow paths.

6. The filter media of claim 2, wherein:
   said feed solution has a first velocity near said inlet side when said feed solution is passed through said feed channel from said inlet side to said outlet side; and
   said target filter velocity characteristics comprise causing each of said plurality of raised features to be encircled by a flow of said feed solution having a velocity of at least one-and-one-half times said first velocity.

7. The filter media of claim 6, wherein:
   said cleaning liquid has a second velocity near said outlet side when said cleaning liquid is passed through said feed channel from said outlet side to said inlet side; and
   said target scouring velocity characteristics comprise causing each of said plurality of raised features to be encircled by a flow of said cleaning liquid having a velocity of at least one-and-one-half times said second velocity.

8. The filter media of claim 1, wherein each of said plurality of raised features comprises a chevron.

9. The filter media of claim 8, wherein said apex has a radius of curvature approximately equal to said predetermined length.

10. The filter media of claim 1, wherein each of said plurality of raised features is U-shaped.

11. The filter media of claim 1, wherein said shortest diagonal distance is approximately 4.1 mm.

12. The filter media of claim 11, wherein said narrowest distance between said first feature is approximately 6.5 mm.

13. The filter media of claim 12, wherein a spacing between aligned ones of said raised features of every other row is approximately 9.3 mm.

14. The filter media of claim 12, wherein each of said plurality of raised features has the same uniform height.

15. The filter media of claim 12, wherein:
   each leg of each of said plurality of raised features is approximately 3.0 mm long;
   each leg of each of said plurality of raised features is approximately 0.5 mm wide; and
   said maximum width of each of said plurality of raised features is approximately 3.5 mm.

16. The filter media of claim 1, wherein each of said plurality of raised features is the same uniform height.

17. The filter media of claim 1, further comprising:
a second membrane portion overlying said plurality of raised features of said first membrane portion; and wherein
said plurality of raised features defines a feed channel between said first and said second membrane portions;
said feed channel includes an inlet side and an outlet side; and
said plurality of raised features are aligned to define a plurality of unobstructed diagonal flow paths in said feed channel, each of said plurality of unobstructed diagonal flow paths having a width greater than said maximum width of each of said plurality of raised features.

18. A filter media comprising:
a first membrane portion having a first surface and a second surface opposite said first surface; and
a plurality of raised features formed in a uniform two-dimensional array on at least said first surface of said first membrane portion, said plurality of raised features being formed in a predetermined configuration defining a plurality of rows and a plurality of columns;
a pump; and wherein
each successive row of said plurality of rows is offset with respect to a preceding row;
each of said plurality of raised features comprises an apex joining two legs of substantially equal length;
each of said legs of each of said plurality of raised features has a same predetermined leg length;
each of said plurality of raised features has a maximum width measured in a row direction;
said plurality of raised features includes a first raised feature disposed in a first row of said array;
said plurality of raised features includes a second raised feature disposed in a second row of said array, said second row of said array being disposed immediately adjacent to said first row of said array;
said plurality of raised features includes a third raised feature disposed in said first row of said array, said third feature being disposed immediately adjacent to said first raised feature;
a shortest diagonal distance between a distal end of one of said legs of said first feature and the apex of said second feature is greater than said same predetermined leg length;
a narrowest distance between said first feature and said third feature is greater than said maximum width;
said first membrane portion is wound around a collection tube defining an axis, said plurality of raised features defining a feed channel parallel to said axis of said collection tube;
said filter media is selectively coupled to sometimes receive said feed solution through said feed channel from said pump in a filtration direction and to other times receive a cleaning solution through said feed channel from said pump in a cleaning direction, respectively; and
said cleaning direction is opposite said filtration direction.

* * * * *